Figure 1:
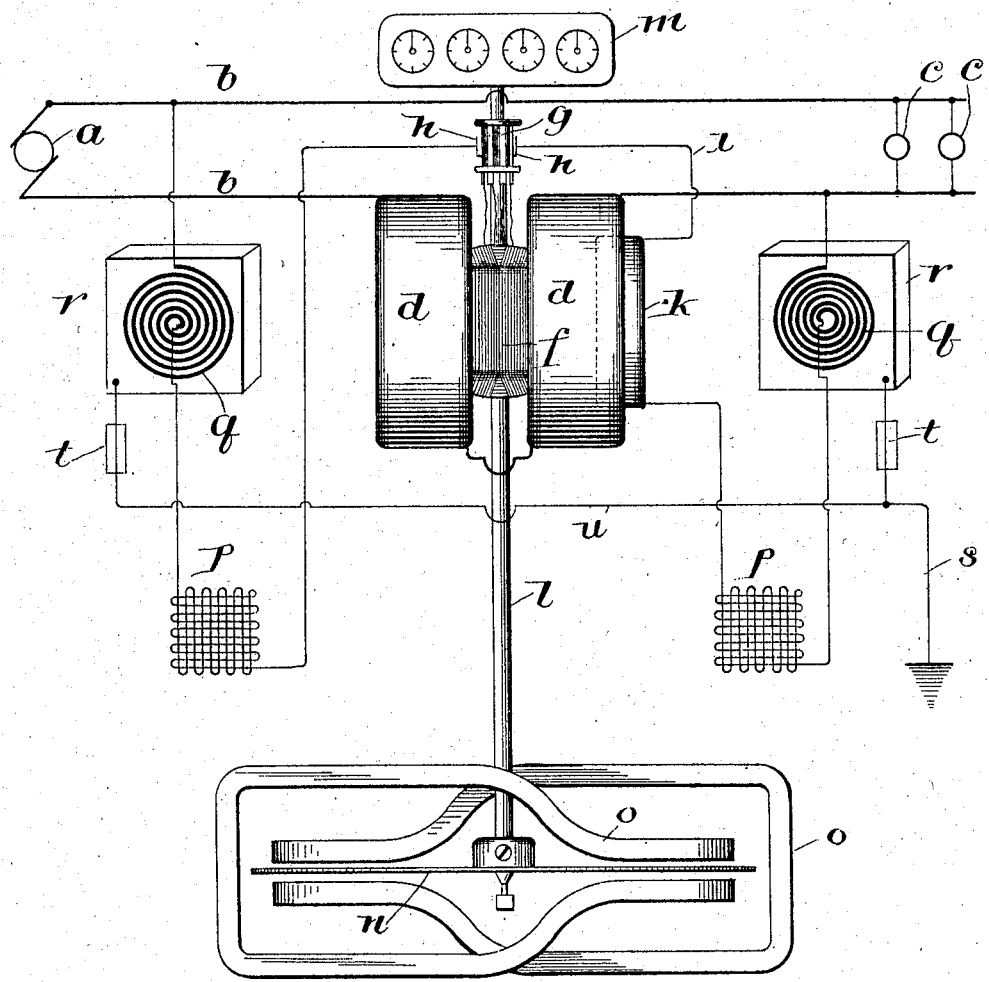

No. 796,068. PATENTED AUG. 1, 1905.
T. DUNCAN.
ELECTRIC METER.
APPLICATION FILED FEB. 26, 1904.

2 SHEETS—SHEET 1.

Witnesses:
C. A. Crawford
Leon Stroh

Inventor:
Thomas Duncan
by G. L. Cragg,
His Attorney

No. 796,068. PATENTED AUG. 1, 1905.
T. DUNCAN.
ELECTRIC METER.
APPLICATION FILED FEB. 26, 1904.

2 SHEETS—SHEET 2.

Witnesses:—
Carl H. Crawford
Leon Stroh

Inventor:
Thomas Duncan
by G. L. Cragg
His Attorney

UNITED STATES PATENT OFFICE.

THOMAS DUNCAN, OF LAFAYETTE, INDIANA.

ELECTRIC METER.

No. 796,068.  Specification of Letters Patent.  Patented Aug. 1, 1905.

Application filed February 26, 1904. Serial No. 195,470.

*To all whom it may concern:*

Be it known that I, THOMAS DUNCAN, a citizen of the United States, residing at Lafayette, in the county of Tippecanoe and State of Indiana, have invented a certain new and useful Improvement in Electric Meters, of which the following is a full, clear, concise, and exact description, reference being had to the accompanying drawings, forming a part of this specification.

My invention relates to motor integrating-wattmeters, and has for its object the provision of means for preventing the action of lightning upon the pressure or armature circuits, the invention being of greatest service in connection with commutated motor-watt-meters, for it is such meters that are most frequently damaged and destroyed by lightning. This danger is of course most prevalent in the summer-time, and in almost every instance the armature is open-circuited and otherwise damaged, so that it renders the meter unfit for use. Very few of the many lighting-stations are equipped with suitable means for repairing or rewinding the pressure-windings of meters and are in consequence obliged to return the meter so damaged to the manufacturers for repair, causing thereby a great deal of inconvenience and the necessity of carrying extra meters in stock for such emergencies in addition to the expense incurred in making repairs and substitutions.

In accordance with my invention I employ inductance-coils in the meter pressure-circuits, (as adapted either to commutated or induction meters,) which inductance-coils are placed in close proximity to ground connections, so that lightning discharges are caused to encounter impedance due to said inductance-coils, which impedance prevents the lightning from continuing to the meter structures, but forces the same to pass or jump by way of the ground connections. As is well known, extraneous resistance is employed in circuit with the armatures of commutated meters, and I desirably include the inductance-coils between the mains and said resistances, so that the lightning in addition to being warded from the meter structures will also be warded from the extraneous resistances. I preferably employ two inductance-coils in connection with each meter structure, the pressure-winding of the meter being interposed between said inductance-coils, as is also the extraneous resistance, which resistance is preferably subdivided into two parts, between which said pressure-winding is disposed, said parts of the resistance being substantially equal, whereby the ohmic and inductive resistance upon each side of the pressure-winding is nicely balanced. Such arrangement, however, tends to cause short circuit between the mains when the lightning effects connection between both inductance-coils and the grounded terminals, and to prevent injurious action of such short circuit fuses may be included, preferably, in open circuit with the inductance-coils, such metallic connection being broken by the action of the fuse. In order that the cost of commutated motor-meters may be kept at the lowest limit, I desirably have the torque or friction compensating coils perform, in addition to their function of compensating for initial friction, so that the meters may operate on light loads, the function of acting as the inductance-coils of my invention, to which end I associate in the neighborhood of these compensating coils grounded terminals, desirably in the form of rings without or within the compensating coils, according to the location of said coils with reference to the field-coils. I desirably nest the compensating coils within the current field-coils and interpose between said compensating coils and the field-coils rings, so that in the event of lightning discharge the only portions of the meter structure destroyed are the compensating coils. In this case, as in the former, the extraneous resistance is desirably subdivided into two parts. The extraneous resistance and the armature are interposed between the compensating inductance-coils, which latter are thus immediately connected to the mains to receive the initial effect of lightning and to prevent the balance of the meter structure from being attacked by lightning.

I will explain my invention more fully by reference to the accompanying drawings, in which—

Figure 2:
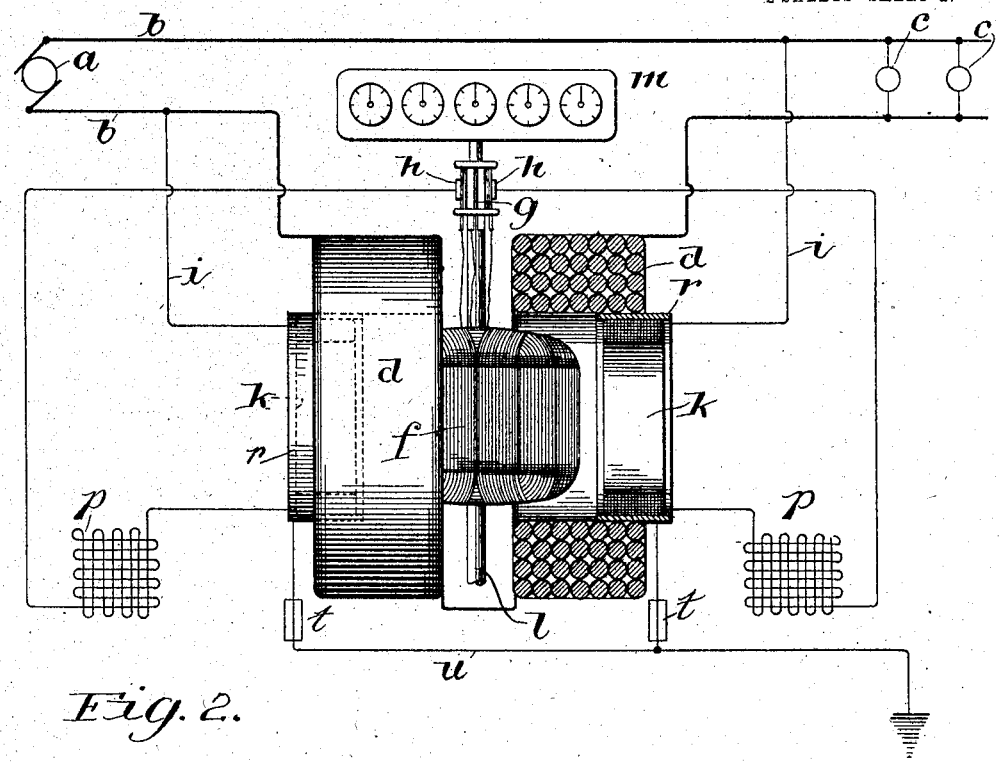
Figure 3:
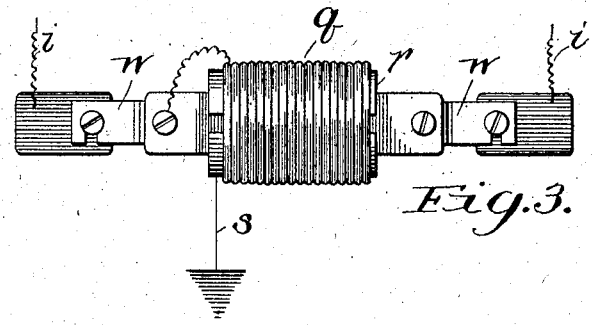
Figures 4, 5:
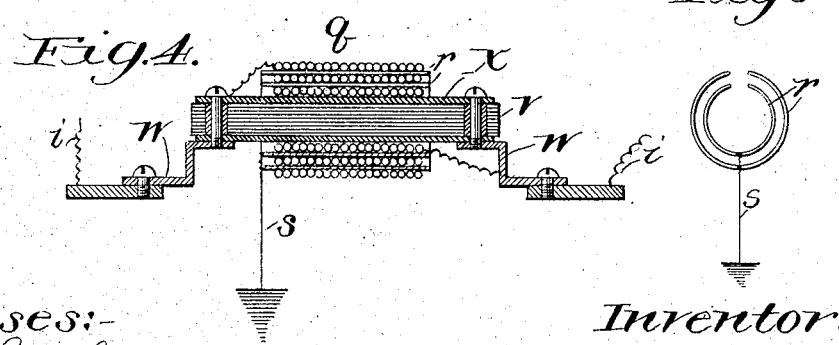

Figures 1 and 2 illustrate structural parts of commutated motor-wattmeters, circuit connections of the meters being diagrammatically indicated, Fig. 2 illustrating the preferred embodiment of the invention. Fig. 3 is a plan view of another form of inductance-coil that may be used in place of the form illustrated in Fig. 1. Fig. 4 is a longitudinal sectional view of the inductance-coil shown in Fig. 3. Fig. 5 is a view in elevation of the form of grounded terminal $r$ of Figs. 3 and 4.

Like parts are indicated by similar characters of reference throughout the different figures.

The drawings illustrate the adaptation of the invention to commutated motor-wattmeters, each being indicated in circuit with a source of electricity $a$, supplying current to mains $b\ b$, that extend to a district of consumption at which I have indicated lamps $c\ c$. The meter is provided with a current field-winding subdivided into coils $d\ d$ and a pressure field-winding subdivided into armature-coils $f$, connected with the segments of the commutator $g$, against which brushes $h\ h$ rest, these brushes $h\ h$ being in bridge of the transmission-mains $b\ b$ by means of a bridge-conductor $i$. This conductor $i$ in the form of the invention illustrated in Fig. 1 includes a friction-compensating torque-coil $k$, provided for the purpose of overcoming initial friction to enable the meter to start upon light loads. In Fig. 2 there are two such friction-compensating coils. The armature-winding and its commutator are mounted upon a shaft $l$, that operates the counting-train $m$ of any suitable formation and carries a damping-disk $n$, arranged within the influence of retarding permanent magnets $o$.

In order that the meter may be adapted to commercial voltages and at the same time have its armature free of too much wire, there is provided for the armature-circuit extraneous resistance that may, for example, be of German-silver wire and which is preferably subdivided into two substantially equal sections $p\ p$ in series with the armature, the torque-coil, and with each other in the same bridge-conductor $i$.

Referring now more particularly to Fig. 1, inductance-windings $q\ q$ are connected directly with the mains, in effect being meter-terminals, as they first have direct connection with the mains and then each with a resistance section $p$, the armature and torque-coil being included between said resistance-sections. These terminal inductances are thus in series with the bridge-conductor $i$, and in order that they may exercise their function there is associated in close proximity thereto grounded plates $r\ r$, which may be of carbon in the form illustrated in Fig. 1 and which may normally be metallically disconnected from the inductance-coils by having the wire of said coils covered either with suitable insulation best adapted to breaking down under the influence of lightning—for example, as cotton or silk—the wire of the inductance-coils being held in any suitable manner against the carbon blocks. If preferred, the inductance-coils may be unprovided with insulating-covering, in which event pieces of paraffined paper or other suitable material that may break down under lightning. These carbon blocks preferably have a common ground connection $s$, said blocks being metallically connected with the ground, but normally disconnected from the inductance-coils, as stated. It will be seen that if the insulation between both inductance-coils and the ground-terminals $r$ is broken down together in a way simultaneously to effect metallic connection between the inductance-coils and said ground-terminals there will be established a direct shunt across the mains about the armature and resistance $p$. To avoid any injurious effect from such a contingency, I include fuses $t$ in circuit with said inductance-coils, said fuses desirably being located in the conductor $u$, directly uniting the ground-terminals, which are blown upon the establishment of such short circuit. I prefer to use two fuses, though one may be made to suffice.

In the construction illustrated in Fig. 2 the same general features are present, and similar parts are given similar characters of reference. In place, however, of employing special inductance-coils $q$ the coils $k$ in inductive relation with the armature are made to perform double duty—that of compensating for the initial friction and of acting as an inductance-coil in a manner similar to the coils $q$, there being associated with the said coils $k$ the grounded conductors $r$ desirably in the form of metallic rings that are normally out of metallic connection with the compensating coils, but which are brought into metallic connection with said coils by lightning discharge. These rings $r$ are desirably interposed between the current-coils and the torque-coils, so as to be adapted for grounding connection not only with the compensating coils, but also with the field-coils. Insulation that is usually provided upon the wire of these coils may be relied upon to normally preserve this connection, but which may under proper stress break down in order to permit such connection. These coils $k$, similar to coils $q$, constitute inductance-terminal coils—that is, they are nearest the mains and in that way may be said to constitute main-inductance terminals with which the meter is designed for connection—and being such terminals the lightning has first action thereupon, and by virtue of the association of said coils with the grounded plates such lightning is prevented from attacking the balance of the meter structure.

In Figs. 3, 4, and 5 the grounded terminal $r$ is desirably subdivided into a number of split tubes that are connected in multiple by the ground-tap $s$. The inductance-winding is preferably distributed in single annular or tube-like layers within, without, and between the tubular sections of the grounded conductor $r$, as indicated most clearly in Fig. 4. The inductance-coil $q$ is disposed about an iron core $v$, suitably mounted on and insulated from the end pieces or terminals $w$. In this way the inductance-coils may be quickly replaced when destroyed. Insulation between the core and inductance-coil is indicated at $x$. This structure insures a positive ground for the discharge by virtue of the grounded strips $r$ being in close proximity to every turn of the inductance-winding, said strips being desirably made very thin. The ends of the inductance-winding are connected with the terminals $w$. It is understood that these impedance-coils $q$ may be placed upon the outside of the meter, as are the fuses. Every time one of them is damaged it can be replaced at a cost very much below that required to supply a new armature.

I believe it to be broadly new with me to provide inductance-coils in close proximity to grounded plates (either of tubular or flat form or other form) and to have such inductance-coils act as terminals to the pressure or armature circuit of the meter. It will be seen how readily the instrumentalities of the meter between these inductance-coil terminals are protected and particularly how effectively these parts are protected in a commutated motor-wattmeter where the resistance is subdivided into two parts, such resistance as a part of the meter structure together with the armature being interposed between said inductance-coil terminals.

It is obvious that changes may be made in the embodiments of my invention shown and particularly described without departing from the spirit of the invention, and I do not, therefore, wish to be limited to the precise constructions shown; but,

Having thus described my invention, I claim as new and desire to secure by Letters Patent—

1. The combination with a commutated motor-wattmeter including in its pressure-circuit a commutated armature and extraneous resistance divided into substantially two equal parts between which said armature is located to adapt said armature to commercial voltage, of inductance-coils for terminals of said pressure-circuit and comprising friction-compensating torque-coils in inductive relation to the armature, grounded terminals normally separated from but in close proximity to said coils, and a fuse in circuit with said grounded terminals, substantially as described.

2. The combination with a commutated motor-wattmeter including in its pressure-circuit a commutated armature and extraneous resistance to adapt said armature to commercial voltage, of inductance-coils for terminals of said pressure-circuit and comprising friction-compensating torque-coils in inductive relation to the armature, grounded terminals normally separated from but in close proximity to said coils, and a fuse in circuit with said grounded terminals, substantially as described.

3. The combination with a commutated motor-wattmeter including in its pressure-circuit a commutated armature and extraneous resistance divided into substantially two equal parts between which said armature is located to adapt said armature to commercial voltage, of inductance-coils for terminals of said pressure-circuit and comprising friction-compensating torque-coils in inductive relation to the armature, and grounded terminals normally separated from but in close proximity to said coils, substantially as described.

4. The combination with a commutated motor-wattmeter including in its pressure-circuit a commutated armature and extraneous resistance to adapt said armature to commercial voltage, of inductance-coils for terminals of said pressure-circuit and comprising friction-compensating torque-coils in inductive relation to the armature, and grounded terminals normally separated from but in close proximity to said coils, substantially as described.

5. The combination with a commutated motor-wattmeter including in its pressure-circuit a commutated armature and extraneous resistance divided into substantially two equal parts between which said armature is located to adapt said armature to commercial voltage, of inductance-coils for terminals of said pressure-circuit, grounded terminals normally separated from but in close proximity to said coils, and a fuse in circuit with said grounded terminals, substantially as described.

6. The combination with a commutated motor-wattmeter including in its pressure-circuit a commutated armature and extraneous resistance divided into substantially two equal parts between which said armature is located to adapt said armature to commercial voltage, of inductance-coils for terminals of said pressure-circuit and grounded terminals normally separated from but in close proximity to said coils, substantially as described.

7. The combination with a commutated motor-wattmeter including in its pressure-circuit a commutated armature and extraneous resistance to adapt said armature to commercial voltage, of inductance-coils for terminals of said pressure-circuit, grounded terminals normally separated from but in close proximity to said coils, and a fuse in circuit with said grounded terminals, substantially as described.

8. The combination with a commutated motor-wattmeter including in its pressure-circuit a commutated armature and extraneous resistance to adapt said armature to commercial voltage, of inductance-coils for terminals of said pressure-circuit, and grounded terminals normally separated from but in close proximity to said coils, substantially as described.

9. The combination with a wattmeter having inductance-coils for terminals of its pressure-circuit, of grounded terminals normally separated from but in close proximity to said coils, and a fuse in circuit with said grounded terminals, substantially as described.

10. The combination with a wattmeter having inductance-coils for terminals of its pressure-circuit, of grounded terminals normally separated from but in close proximity to said coils, substantially as described.

11. The combination with a commutated motor-wattmeter including in its pressure-circuit a commutated armature and extraneous resistance divided into substantially two equal parts between which said armature is located to adapt said armature to commercial voltage, of an inductance-coil for a terminal of said pressure-circuit and comprising a friction-compensating torque-coil in inductive relation to the armature, a grounded terminal normally separated from but in close proximity to said coil, and a fuse in circuit with said grounded terminal, substantially as described.

12. The combination with a commutated motor-wattmeter including in its pressure-circuit a commutated armature and extraneous resistance to adapt said armature to commercial voltage, of an inductance-coil for a terminal of said pressure-circuit and comprising a friction-compensating torque-coil in inductive relation to the armature, a grounded terminal normally separated from but in close proximity to said coil, and a fuse in circuit with said grounded terminal, substantially as described.

13. The combination with a commutated motor-wattmeter including in its pressure-circuit a commutated armature and extraneous resistance divided into substantially two equal parts between which said armature is located to adapt said armature to commercial voltage, of an inductance-coil for a terminal of said pressure-circuit and comprising a friction-compensating torque-coil in inductive relation to the armature, and a grounded terminal normally separated from but in close proximity to said coil, substantially as described.

14. The combination with a commutated motor-wattmeter including in its pressure-circuit a commutated armature and extraneous resistance to adapt said armature to commercial voltage, of an inductance-coil for a terminal of said pressure-circuit and comprising a friction-compensating torque-coil in inductive relation to the armature, and a grounded terminal normally separated from but in close proximity to said coil, substantially as described.

15. The combination with a wattmeter having as a terminal for its pressure-circuit an inductance-coil, of a grounded terminal normally separated from but in close proximity to said coil, substantially as described.

16. The combination with a wattmeter having as a terminal for its pressure-circuit an inductance-coil, of a grounded terminal normally separated from but in close proximity to said coil, and a fuse in circuit with said grounded terminal, substantially as described.

In witness whereof I hereunto subscribe my name this 22d day of February, A. D. 1904.

THOMAS DUNCAN.

Witnesses:
EUGENE HALFORD CORSELLIS,
ROYAL A. STREETER.